United States Patent [19]

Callele et al.

[11] Patent Number: 5,343,516

[45] Date of Patent: * Aug. 30, 1994

[54] COMPUTER TELECOMMUNICATIONS SIGNALLING INTERFACE

[75] Inventors: David Callele; Donald Cruickshank, both of Saskatoon, Canada

[73] Assignee: Digital Systems Group, Inc., Saskatchewan, Canada

[ * ] Notice: The portion of the term of this patent subsequent to May 26, 2009 has been disclaimed.

[21] Appl. No.: 834,855

[22] Filed: Feb. 13, 1992

Related U.S. Application Data

[63] Continuation-in-part of Ser. No. 588,941, Sep. 27, 1990, Pat. No. 5,117,452.

[51] Int. Cl.⁵ .................................. H04M 11/00
[52] U.S. Cl. .................................. 379/98; 379/90; 379/93; 379/442; 379/142
[58] Field of Search ............... 379/98, 90, 96, 97, 379/94, 93, 142, 372, 376, 413, 441, 442, 387, 201

[56] References Cited

U.S. PATENT DOCUMENTS

| | | | |
|---|---|---|---|
| 4,543,450 | 9/1985 | Brandt | 179/2 C |
| 4,551,581 | 11/1985 | Doughty | 179/2 A |
| 4,578,533 | 3/1986 | Pierce | 179/2 DP |
| 4,578,541 | 3/1986 | Dodds | 379/373 |
| 4,582,956 | 4/1986 | Doughty | 379/96 |
| 4,640,989 | 2/1987 | Riner | 379/94 |
| 4,748,656 | 5/1988 | Gibbs et al. | 379/93 |
| 4,776,005 | 10/1988 | Petriccione | 379/142 |
| 4,860,342 | 8/1989 | Danner | 379/96 |
| 4,894,861 | 1/1990 | Fujioka | 379/142 |
| 4,897,866 | 1/1990 | Majmudar et al. | 379/201 |
| 5,001,710 | 3/1991 | Gawrys et al. | 379/94 |
| 5,010,399 | 4/1991 | Goodman et al. | 379/102 |
| 5,054,055 | 10/1991 | Hanle et al. | 379/142 |
| 5,117,452 | 5/1992 | Callek et al. | 379/98 |
| 5,128,987 | 7/1992 | McDonough et al. | 379/102 |

FOREIGN PATENT DOCUMENTS

| | | | |
|---|---|---|---|
| 1192644 | 8/1985 | Canada | 340/97 |
| 1225726 | 8/1987 | Canada | 344/0.5 |
| 2-202278 | 8/1990 | Japan | 379/142 |
| 0029456 | 2/1991 | Japan | 379/142 |
| 88/02206 | 3/1988 | World Int. Prop. O. | 379/96 |

Primary Examiner—Curtis Kuntz
Assistant Examiner—Stella L. Woo
Attorney, Agent, or Firm—Dressler, Goldsmith, Shore & Milnamow, Ltd.

[57] ABSTRACT

A telecommunications signalling interface for computer systems is presented. Control and information signals from the telephone switch are received, decoded, and converted to a standard interface format for retransmission to the computer. Control and information signals from the computer are received and converted to a standard format for transmission to the telephone switch. The power supply for the device may be derived from the telephone network and the computer interface.

45 Claims, 17 Drawing Sheets

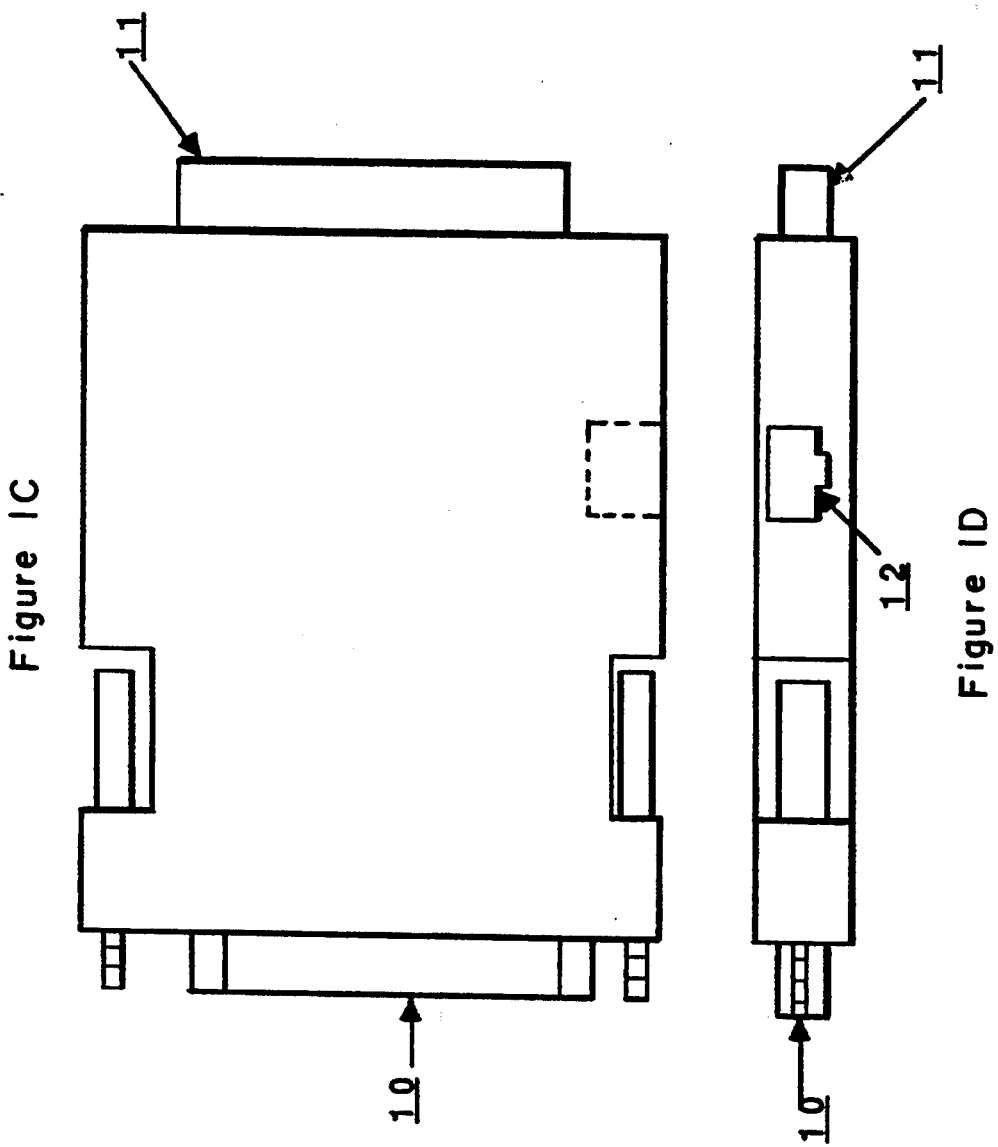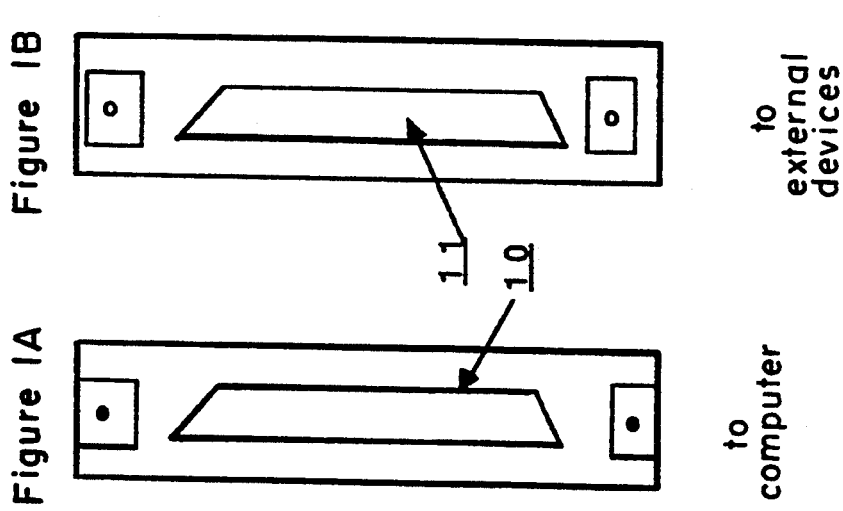

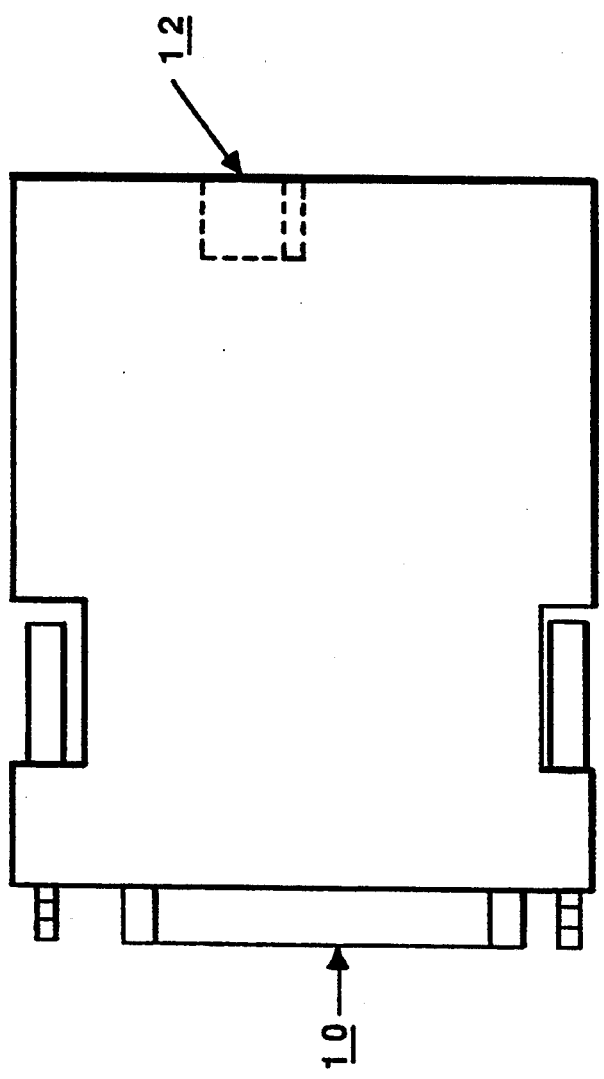
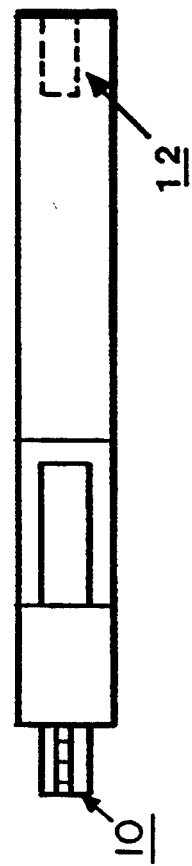
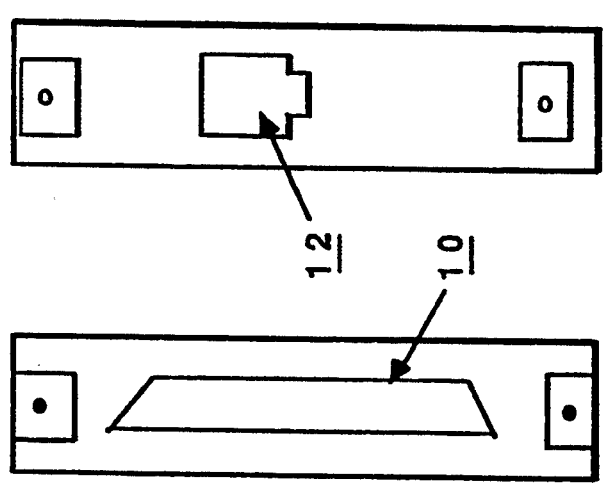

COMPUTER TELECOMMUNICATIONS SIGNALLING INTERFACE

BACKGROUND OF THE INVENTION

This application is a Continuation In Part of application Ser. No. 07/588,941 filed Sep. 27, 1990, now U.S. Pat. No. 5,117,452, for a Computer Telecommunications Signalling Interface. This invention relates to a telecommunications interface for personal computers (PCs) that allows the PC to act as a terminal for telecommunications signalling that complies with Bellcore specification TR-TSY-000030, popularly known as CLASS (trademark).

There are many types of telephone services available. The most basic service is called POTS (Plain Old Telephone Service) and is typically associated with residential and small business users. The general service offering for businesses, popularly called CENTREX, provides services such as Call Forwarding and Call Waiting through the use of proprietary control channels. ISDN (trade-mark) (Integrated Services Digital Network) provides combined voice, data, and control channels using nonproprietary signalling. CLASS (Custom Local Area Signalling Services) provides a nonproprietary control channel so that services normally associated with CENTREX can be provided to residential and small business customers.

The general signalling scheme used by CLASS was first described in U.S. Pat. No. 4,551,581, the basic AT&T CLASS patent. It describes a method of delivering the required signalling during the silent period of the ring cycle. The first application of this signalling to customer premises equipment (i.e. CLASS CPE) is taught in Canadian patent 1,225,726, filed Jul. 12, 1983 entitled "Method and Apparatus for Displaying at a Selected Station Special Service Information During a Silent Interval Between Ringing". This patent deals with apparatus capable of delivering the incoming signalling information in a format that may be interpreted by humans. The subject of the present patent is an interface for delivering the incoming signalling information in a format that may be interpreted by a computer system. The marketplace forced an industry wide consensus on the specifications to be used by the signalling channel, from the Customer Premise Equipment (CPE) viewpoint, to be developed. It is given in Bellcore Technical Reference TR-TSY-000030, "SPCS Customer Premises Equipment Data Interface", Issue 1, November, 1988.

The marketplace has also brought forward a number of other implementations of CPE for CLASS designed for human use, both in the form of fully featured, highly intelligent telephone sets and in the form of adjunct units to existing telephones, containing alphanumeric or numeric displays and function keys to take advantage of the new features.

None of the existing or proposed systems provide an interface device for connecting a PC to the network using CLASS signalling. U.S. Pat. No. 4,748,656 teaches the use of a PC as an interface between a telephone and a business communications system with the PC terminating both the telephone set and the business communications system but it is a system that operates in serial fashion—the business communications system to the PC to the telephone. The invention described by this patent operates in parallel with the telephone—the business communications system to the PC and the telephone at the same time. Also, the signalling format used in U.S. Pat. No. 4,748,656 is proprietary and differs from the specifications set out in Bellcore TR-TSY-000030.

U.S. Pat. No. 4,776,005, "Computer Based Information System For Character Display Phone Network" teaches the use of a PC to enhance the functionality of a multi-line PBX display telephone to allow it to be used as the heart of a messaging system (i.e. one operator/receptionist for up to hundreds of numbers). While the intent of this patent and this system are somewhat similar, the present patent provides a computer interface for a different type of signalling than that used by U.S. Pat. No. 4,776,005.

One drawback of telephone sets that comply with Bellcore specification TR-TSY-000030 is the complexity of the required circuitry. This circuitry requires larger amounts of electrical power than classic telephone sets and, for some features, must be independent of power supply failure from the telephone switch. These requirements force CLASS sets to have either internal batteries or an external power supply—both of which are impediments to acceptance in the marketplace.

The most cost effective method of implementing the invention is to power it from the computer interface or the telephone line, thus eliminating the need for a separate power supply. If computing platform independence is not required, the invention can be implemented as a card that plugs into an internal slot. However, if the invention is to be powered from the computer interface then, since all computers do not have the same internal interfaces, it is desirable to implement the invention in a manner that will derive power from a standard external interface. Canadian Patent No. 1192644 teaches a method of deriving power from the terminal interface for a data communications apparatus. U.S. Pat. No. 4,543,450 teaches the integration of connector and modem that derives power through at least one pin of the connector.

Alternatively, U.S. Pat. No. 4,578,533 teaches a method of extracting power from the telephone line to power a modem for data communications.

However, deriving power solely from either source is very unlikely to be sufficient to provide the power necessary for proper functioning of the invention. Not only would the requirements for energy storage (in capacitors) force an uneconomical solution but the reliability of the system in power failure conditions would be unacceptable. A combination of the two approaches, however, would be able to provide the necessary power with an acceptable level of reliability.

For purposes of discussion, the external implementation will be the preferred embodiment because it is independent of the computing platform. In all discussions of embodiments, the essential elements of the invention, not including the power supply mechanism, are the same for the internal and external implementation.

In summary, existing mechanisms for utilizing telecommunications signals, transmitted according to the format specified in Bellcore TR-TSY-000030, are for conventional telephone sets for human use. These devices take the form of fully featured, highly intelligent telephone sets or as adjunct display units that work in parallel with existing telephones. The capabilities of these systems are hampered by their need to be cost competitive with conventional telephone sets and to draw their power from the telephone network, and internal batteries or an external power supply. The invention presented herein is, effectively, a telephone set for a computer. The invention takes advantage of the greater intelligence of the computer to provide a system of greater functionality and ease of use than existing systems. The power supplies of the computer and the telephone network are used to provide the extra power requirements with an acceptable level of reliability.

SUMMARY OF THE INVENTION

According to one broad aspect of the invention, there is provided a telephone interface for connecting a computer to a telephone line for use in telephone systems employing information signalling during the silent interval between rings comprising line interface means for interfacing the telephone interface with the telephone line, first computer interface means for interfacing the telephone interface with a computer, and data demodulation means connected with the line interface means and with the first computer interface means for receiving data transmitted over the telephone line during a silent interval after a ringing signal, whereby in operation data present on the telephone line during the silent interval is retransmitted through the first computer interface means.

BRIEF DESCRIPTION OF THE DRAWINGS

The invention will now be described in detail with reference to the accompanying drawings, in which:

FIG. 1 illustrates the invention implemented with pass through of RS-232 signals.

FIG. 2 illustrates the invention implemented as a terminal device with no pass through of the RS-232 signals.

DETAILED DESCRIPTION OF THE INVENTION

Figure 3:
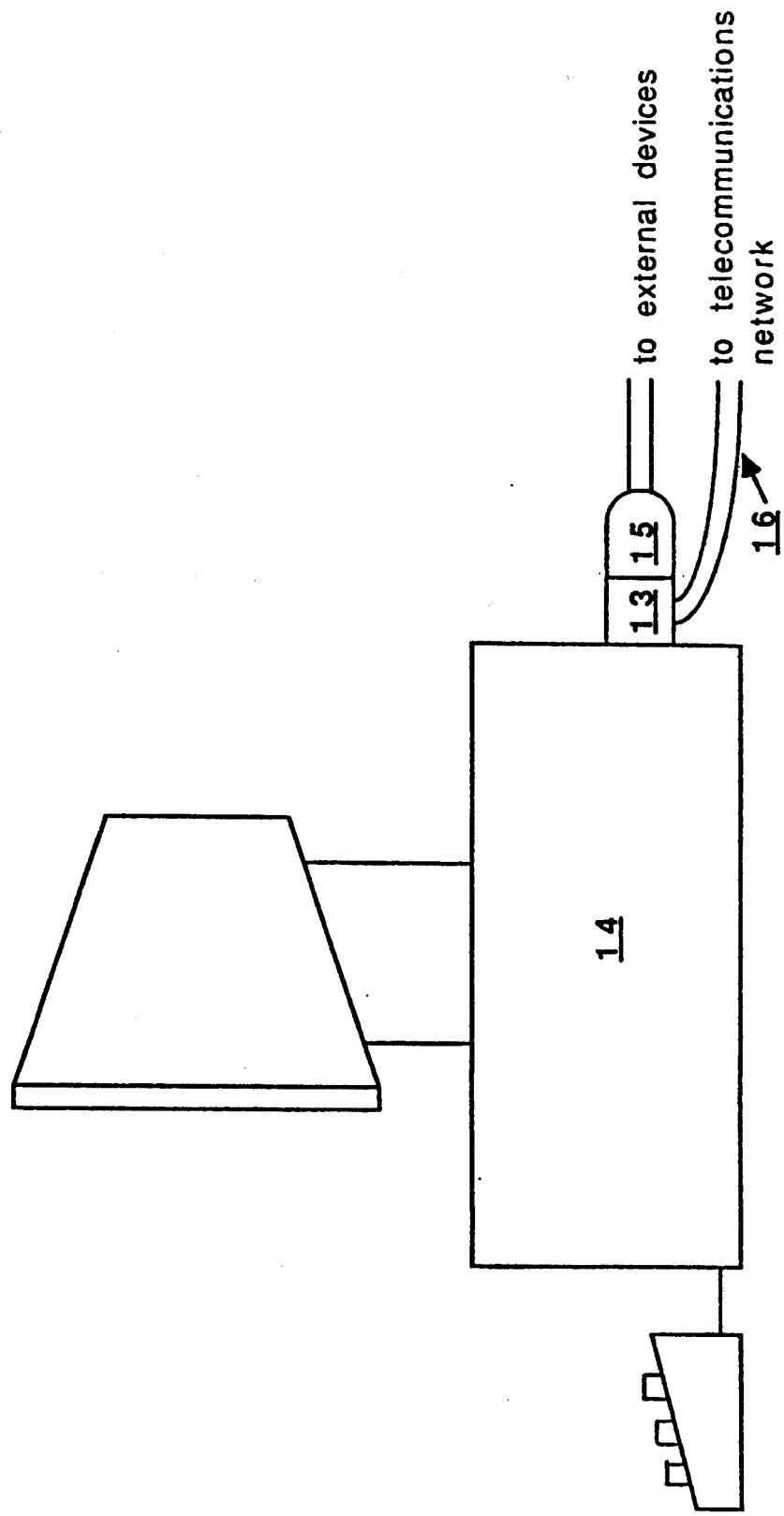
FIG. 3 illustrates the embodiment of FIG. 1 installed on a microcomputer.

The invention is the hardware portion of an office automation tool that integrates computing mechanisms, such as desktop PCs, with the telecommunications network. This integration is a cost effective way to take advantage of the new services to be offered to telecommunications customers at large under the Service Mark CLASS. The hardware reception mechanism is relatively simple; however, the terminal itself must be relatively intelligent to be able to deal with the capabilities of the new features.

Examples of these new features are Automatic Callback, Repeat Dial, Selective Call Forwarding and Rejection, and Calling Number Delivery. The most significant of these features to this invention is Calling Number Delivery. This feature transmits the calling party's telephone number to the called party's telephone during the first silent period of three seconds duration (or greater) following a ring cycle. A ring cycle is typically defined as two seconds of ringing followed by four seconds of silence. However, other ringing patterns are used, hence the need for the definition of three seconds of silence. The calling number is transmitted as a burst of 1200 bit per second modem tones (that comply with the Bell 202 modem standard) and is received by the customer's telephone equipment. This equipment is typically a specialty telephone set with display and extra feature buttons or an add on display device that provides the extra functionality in concert with the existing telephone. All other features mentioned are programmed into the telephone set or telephone switch using special access codes.

Traditional telecommunications equipment suppliers would have the customer purchase these intelligent telephone terminals. The approach taken by this invention combines the hardware reception mechanism with the intelligence of a desktop PC (or other computer). The hardware portion is thus less expensive than a fully featured intelligent telephone terminal (yet competitive with the adjunct display unit) and the intelligence of the desktop PC far exceeds that which is capable of being cost effectively integrated into a telephone set. The result is a product that can provide greater functionality at a lower or equivalent cost. It provides a much friendlier man-machine interface and is software (rather than hardware) upgradable.

For purposes of illustrating the preferred embodiment, the computing device used in conjunction with the invention is a desktop personal computer (PC). The invention is in no way limited to this computing platform and can, with appropriate software, be connected to any computing device that supports the proper type of external interface (in the preferred embodiment, an RS-232 interface). Optionally, the invention may be made internal to the computer, as by means of a plug-in card to be plugged into a slot (ie—backplane interface) of a computer, in which case, the invention may be powered directly by the computer.

The preferred embodiment of the invention is effectively a fully featured telephone set and a 1200 bits per second modem, powered by a combination of the telephone network and the PC interface. The invention complies with the specifications outlined in Bellcore Technical Reference TR-TSY-000030, Issue 1, November, 1988 "SPCS Customer Premises Equipment Data Interface" for CLASS terminals. It also provides an interface to the CLASS signalling channel and methodology for the PC. This interface allows the invention, in conjunction with the software executing on the PC, to automate many common office tasks that deal with the telecommunications network.

With reference to FIG. 1 and FIG. 2, the preferred embodiment of the invention is an external peripheral device that may (FIG. 1) or may not (FIG. 2) provide pass through capability for the port signal lines. It measures approximately 9 cm by 9 cm by 3 cm and plugs into one of the standard ports on the back of the PC. It could be designed to plug into the parallel (printer) port or the RS-232 (serial) port. Note that the device may be separated from the PC by an arbitrary length of cabling (in keeping with the port standard) without detriment.

The preferred embodiment shown in FIG. 1 is for a device that connects to the RS-232 port through connector 10 and provides pass through of the RS-232 signals through connector 11. The invention is connected to the telephone network through connector 12. The preferred embodiment shown in FIG. 2 is for a device that connects to the RS-232 port through connector 10 and to the telephone network through connector 12.

FIG. 3 illustrates the pass through implementation of the invention 13 attached to a desktop PC 14. The invention is connected to the telecommunications network via the telephone line 16 and the RS-232 signals are passed through the invention 13 to other external devices via RS-232 cable One normally skilled in the art would be capable of modifying the interface leads to adapt to a parallel interface rather than serial interface without further invention. Such circuits are found in many places in the literature.

In the embodiment illustrated in FIG. 1, the invention has no effect on the normal operation of the port when not in use—all signals transparently pass through the device without apparent modification. When actively receiving, the invention acts as a T-junction; if necessary signalling the other external device(s) to wait while it transfers the information provided by the telecommunications network to the PC. This information is typically the calling party's name or telephone number (see description of delivery mechanism above). After it has finished, the invention reverts to transparent mode. When actively transmitting, the invention signals the other external device(s), if necessary, that the port is in use. It then sends information to the telephone switch, over the telephone line, using DTMF tones (those generated by a Touch-Tone (trade-mark) telephone set). These tones are used to set up telephone number lists for features such as Selective Call Forwarding or for access to special features such as Customer Originated Trace. Although not shown in the drawings, this information could also be sent by means of dial pulses in those situations where DTMF signalling was not available.

In the embodiment illustrated in FIG. 2, the invention terminates the port to which it is attached. When an incoming call is received the invention transfers the information provided by the telecommunications network to the PC. This information is typically the calling party's name or telephone number (see description of delivery mechanism above). After it has finished, the invention reverts to standby mode. When actively transmitting, the invention sends information to the telephone switch, over the telephone line, using DTMF tones (those generated by a Touch-Tone telephone set). These tones are used to set up telephone number lists for features such as Selective Call Forwarding or for access to special features such as Customer Originated Trace. As in the case of the implementation above, this information could also be sent by means of dial pulses in those situations where DTMF signalling was not available.

The following discussions refer to incoming and outgoing ports on the invention. In all cases, the incoming port is that which is attached to the computing platform (DTE) and the outgoing port is that which connects to devices external to the computing platform (DCE).

Figure 4:
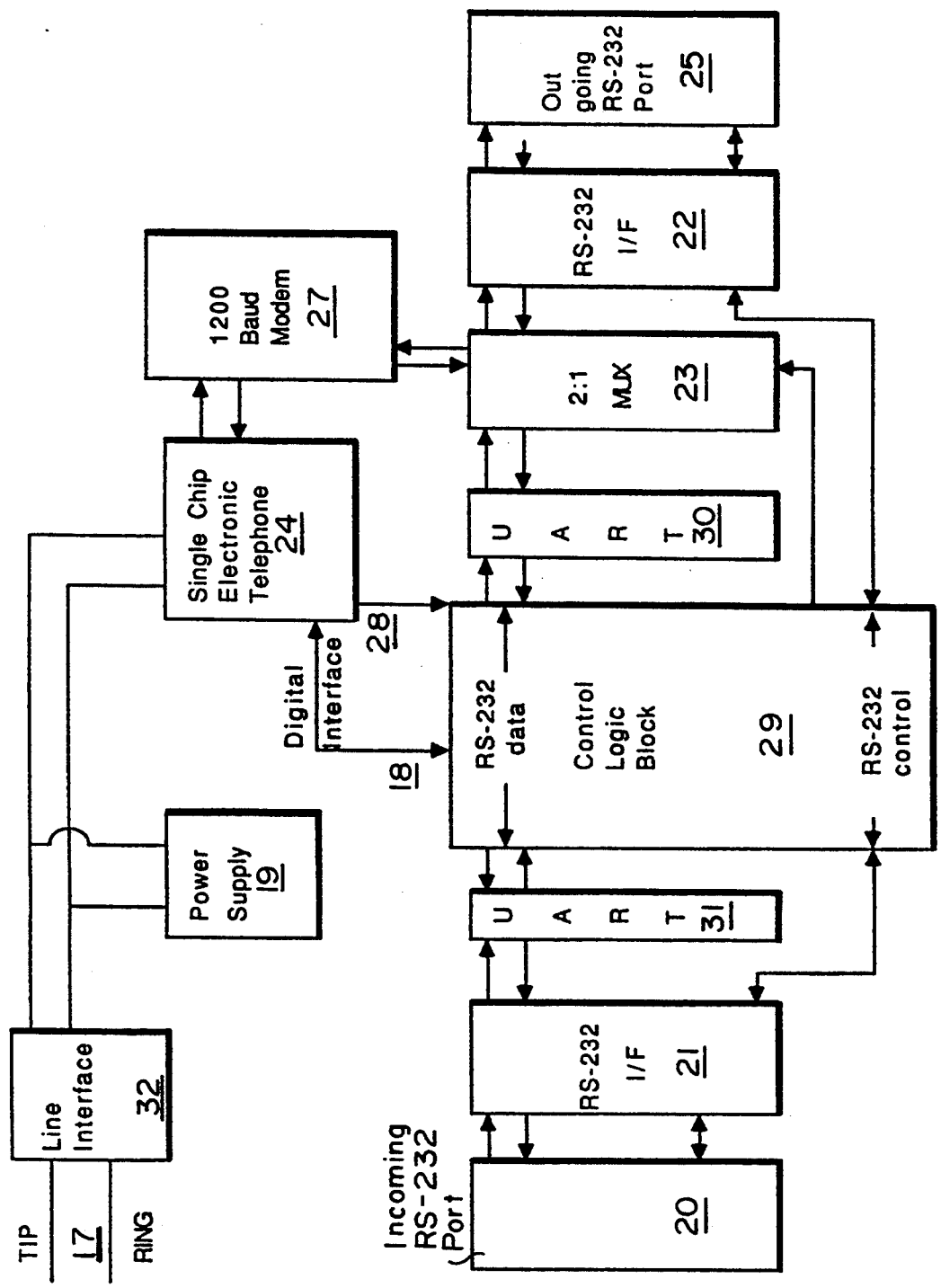
FIG. 4 illustrates an embodiment of the invention implemented with pass through of RS-232 signals.

FIG. 4 illustrates the preferred embodiment of the invention with pass through of the RS-232 signalling.

The invention is connected to the telephone network TIP and RING leads 17 via the line interface 32. The function of the line interface is to provide proper termination characteristics in accordance with EIA RS-470 and Bellcore TR-TSY-000030, line isolation, hook switch relay control, and line ringer rectification interface. Power for the invention is derived from the power supply 19, further explained in FIG. 6.

The output of the line interface 32 is connected to the single chip electronic telephone 24. There are many sources for this type of device but one with a microprocessor interface 18, such as the Motorola MC34010A, is particularly suited for this application. This interface allows the control logic block 29 to control the output of DTMF tones. Provision is also made in the aforementioned electronic telephone chip 24 (Motorola MC34010A) for automatic switching of the power source for chip 24 from the telephone line to the digital interface 18 through a control input on the digital interface 18 on the electronic telephone chip 24, a very useful feature for this application. The digital interface 18 allows the DTMF tone generator circuitry within the electronic telephone chip 24 to be driven by a TTL level signal rather than by a keypad. Discrete support devices such as diodes, capacitors, and resistors are not shown here but nominal circuit designs may be found in the manufacturers application notes. Alternatively, where it is desired to effect CLASS signalling by dial pulse, the control logic means 29 would effect the dial pulses by causing the on-hook/off-hook status of the invention to toggle in the prescribed fashion by means of appropriate switching circuitry (not shown) associated with the telephone line. Such circuitry is considered rudimentary to a person skilled in the art and is not further described.

The output of the tone ringer circuit 28 of the electronic telephone chip 24 is connected to the control logic block 29 to signal the presence of ring signal on the telephone line. The transmission of the CLASS signalling information follows the end of the ring cycle by a minimum of 500 msec. A more common value for this guard time is 600 msec to 650 msec. The control logic block 29 performs a timeout sequence for this guard period in preparation for an incoming transmission and thereafter the modem 27 is activated on the line. If a particular pattern of data in accordance with the CLASS specification is received after this period, then control logic block 29 will function to pass subsequent incoming data received over the line through to the computer.

The speech network of the single chip telephone 24 is coupled to the analog receive and transmit networks of the 1200 bits per second modem 27. Single chip implementations of a 1200 bits per second modem are readily available and, once again, discrete support devices are not shown. Coupling the modem through the speech network simplifies the modem 27 design by taking advantage of the automatic gain control and line interface features of the telephone chip 24. The digital input and output ports of the modem 27 are connected to the 2:1 multiplexer 23. Although only the demodulator portion of the modem is necessary to fully implement the current CLASS protocol definition, it is envisaged that the modulator portion of the modem may be utilised in order to allow data to be sent through the invention to the telephone network.

The multiplexer 23 input selection is controlled by the control logic block 29. If the invention is not currently activated, the multiplexer select is set such that RS-232 signals are directly passed through the invention. If the invention is currently active, the outgoing RS-232 drivers/receivers 22 are set to designate the data terminal equipment (DTE) as busy and the multiplexer select is set such that signals are passed through the modem 27. If the invention is currently in pass through mode and an incoming call is received, the outgoing RS-232 drivers/receivers 22 are set to designate DTE busy, the incoming RS-232 drivers/receivers 21 are set to designate data communications equipment (DCE) busy, and the multiplexer 23 is selected to communicate with the modem 27.

The invention must now signal the PC that the source of DCE signals has changed from the RS-232 port pass through to the telephone network. Control logic block 29, outgoing UART 30, and incoming UART 31 perform this function in conjunction with software on the PC. A byte stuffing method is used. All data transmissions entering the invention through the outgoing RS-232 drivers/receivers 22 are received by the outgoing UART 30. The outgoing UART 30 passes the data stream to the control logic block 29. The control logic block watches the data stream for the presence of four consecutive bytes of FFH (hex). Every time the control logic block 29 finds a string of this pattern, it signals the external device connected to the outgoing port 25 to wait while it inserts a byte into the incoming data stream. The software on the PC automatically strips out the first byte pattern that follows a stream of four consecutive bytes of FFH. If the software on the PC encounters a stream of five consecutive bytes of FFH it recognizes this as a signal that the source of the incoming data is toggling to the other state (ie—to the telephone network). That is, as the data was coming from the outgoing RS-232 port 25, then the data is now coming from the telephone network. Therefore, the change in data source is signalled as soon as possible after the start of ring signal by the control block 29 transmitting a sequence of five consecutive occurrences of FFH to the PC. If the software on the PC encounters a stream of four consecutive bytes of FFH followed by one byte of 00 H it recognizes this as a signal that the source of the incoming data is remaining the same. That is, if the data was coming from the outgoing RS-232 port 25 then the data is still coming from the telephone network, or vice versa. If the software on the PC encounters a stream of four consecutive bytes of FFH followed by one byte of 80 H, it recognizes this as a completion signal to indicate that the incoming data from the telephone network has been received and to switch the source of data away from the telephone network. Therefore, byte stuffing is used to signal the transition state. A stuffed byte with a value of FFH signals a transition in the source of data to the telephone network; a stuffed byte with a value of 00 H signals no transition in the source of data; a stuffed byte with a value of 80 H signals a transition away from the telephone network. Any value for the fifth byte which is neither FFH, 80 H or 00 H will cause a query/answer sequence to occur in order to resolve the ambiguity thus produced. Provision is thus reserved for use of the 253 other available bit patterns for signalling purposes.

The control logic block 29 generates the appropriate RS-232 control signals to accompany the data stream. If necessary, the control logic block 29 buffers the incoming data until the PC is ready to accept transmission.

The digital logic level outputs and inputs of the control logic block 29 are level shifted to the required interface levels by the RS-232 drivers/receivers 21 and 22. These signals are then coupled to the RS-232 port 20 of the PC and the outgoing RS-232 port 25.

Figure 5:
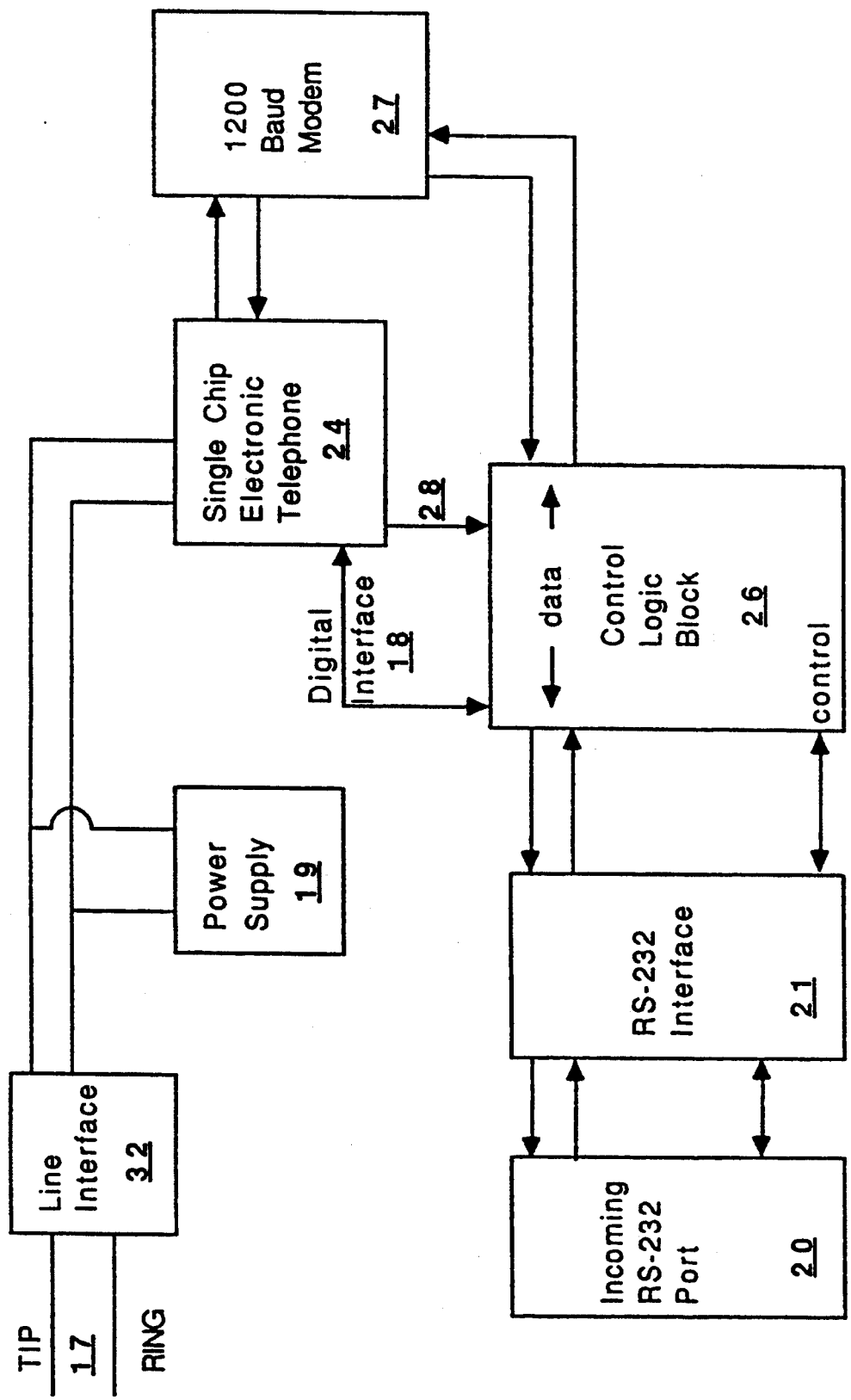
FIG. 5 illustrates an embodiment of the invention implemented as a terminal device.

FIG. 5 illustrates the preferred embodiment of the invention as a terminal device.

The invention is connected to the telephone network TIP and RING leads 17 via the line interface 32. The function of the line interface is to provide proper termination characteristics in accordance with EIA RS-470 and Bellcore TR-TSY-000030, line isolation, hook switch relay control, and line ringer rectification interface. Power for the invention is derived from the power supply 19, further explained in FIG. 6.

The output of the line interface 32 is connected to the single chip electronic telephone 24. As stated previously, there are many sources for this type of device but one with a microprocessor interface be, such as the Motorola MC34010A, is particularly suited for this application. This interface allows the control logic block 26 to control the output of DTMF tones. Provision is also made in the aforementioned electronic telephone chip 24 (Motorola MC34010A) for automatic switching of the power source for chip 24 from the telephone line to the digital interface 18 through a control input on the digital interface be on the electronic telephone chip 24, a very useful feature for this application. The digital interface be allows the DTMF tone generator circuitry within the electronic telephone chip 24 to be driven by a TTL level signal rather than by a keypad. Discrete support devices such as diodes, capacitors, and resistors are not shown here but nominal circuit designs may be found in the manufacturers application notes. Alternatively, where it is desired to effect CLASS signalling by dial pulse, the control logic means 29 would effect the dial pulses by causing the on-hook/-off-hook status of the invention to toggle in the prescribed fashion by means of appropriate switching circuitry (not shown) associated with the telephone line. Such circuitry is considered rudimentary to a person skilled in the art and is not further described.

The output of the tone ringer circuit 28 of the electronic telephone chip 24 is connected to the control logic block 26 to signal the presence of ring signal on the telephone line. The transmission of the CLASS signalling information follows the end of the ring cycle by a minimum of 500 msec. A more common value for this guard time is 600 msec to 650 msec. The control logic block 26 performs a timeout sequence for this guard period in preparation for an incoming transmission and thereafter connects the modem 27 to the line. If a particular pattern of data in accordance with the CLASS specification is received after this period, then control logic block 29 will function to pass subsequent incoming data received over the line through to the computer.

The speech network of the single chip telephone 24 is coupled to the analog receive and transmit networks of the 1200 bits per second modem 27. Single chip implementations of a 1200 bits per second modem are readily available and, once again, discrete support devices are not shown. Coupling the modem through the speech network simplifies the modem 27 design by taking advantage of the automatic gain control and line interface features of the telephone chip 24. The digital input and output ports of the modem 27 are connected to the control logic block 26. The control logic block 26 generates the appropriate RS-232 control signals to accompany the data stream. If necessary, the control logic block 26 buffers the incoming data until the PC is ready to accept transmission. Although only the demodulator portion of the modem is necessary to fully implement the current CLASS protocol definition, it is envisaged that the modulator portion of the modem may be utilised in order to allow data to be sent through the invention to the telephone network.

The digital logic level outputs and inputs of the control logic block 26 are level shifted to the required interface levels by the RS-232 drivers/receivers 21. These signals are then coupled to the RS-232 port 20 of the PC.

Figure 6:
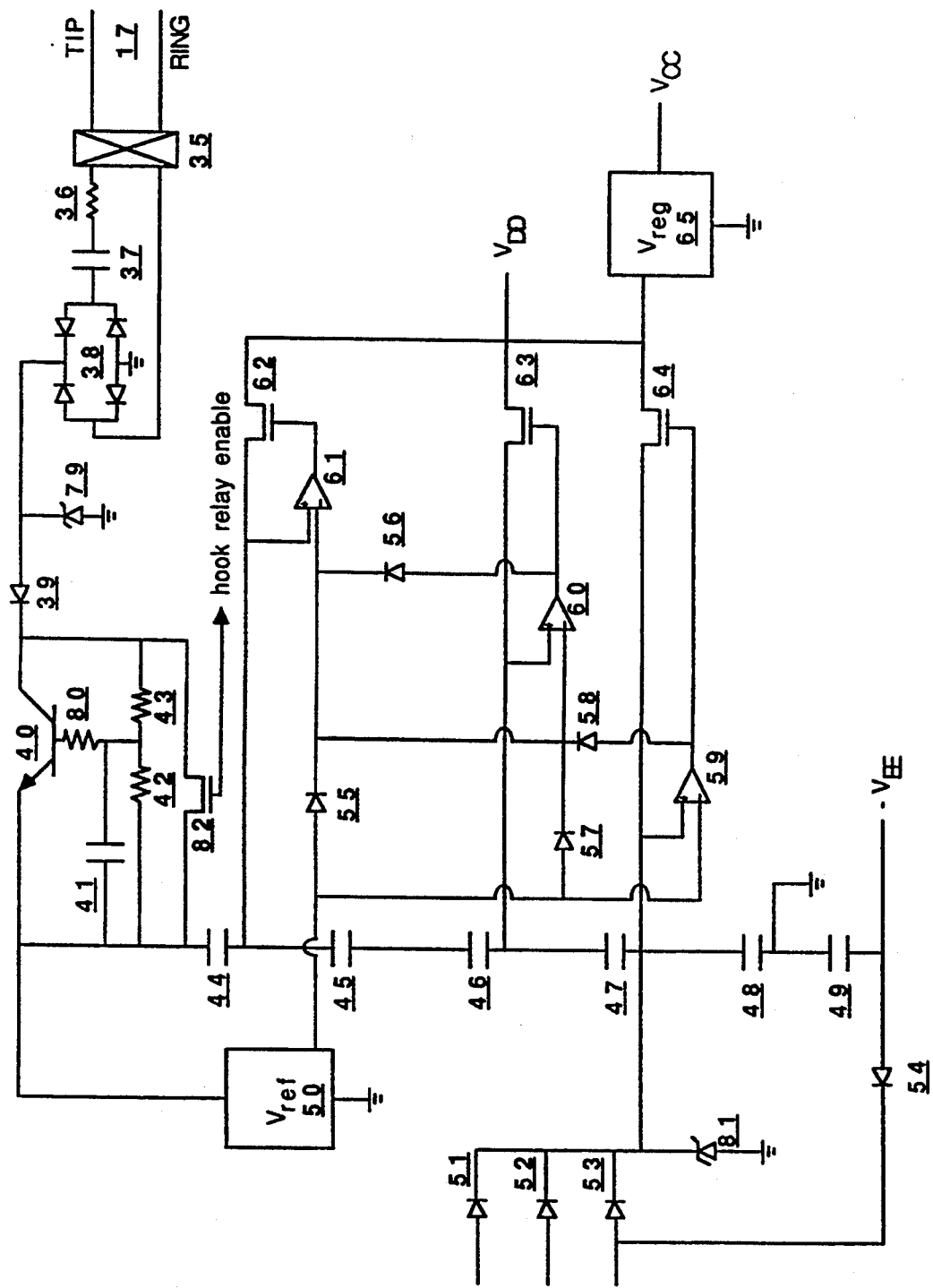
FIG. 6 illustrates the preferred embodiment of the power supply of the invention.

The power supply for this invention is detailed in FIG. 6. One aspect of this invention is the elimination of the need for an external power supply for the circuit. Rather, it draws power from the telephone network and the PC. The design of the power supply is complicated by requirements that portions of the circuit be active in both the on hook and off hook states. Variations in subscriber loop length can greatly vary the voltage and current levels available to the invention from the telephone network. Variations in RS-232 interface circuit driver design can also significantly vary the voltage and current levels available to power the invention from the PC. Therefore, a combination of drawing power from the terminal interface and from the telephone network is required to reliably produce an implementation that will function across a wide variety of subscriber loop lengths and RS-232 interface designs.

The nominal subscriber loop requirement for maintaining an off hook state is a current draw of 20 mA. However, on short loops, this line current could reach 100 mA. Therefore, the typical electronic telephone set dissipates most of this energy through a resistive load. The invention uses some or all of this energy to power itself rather than dissipating it.

The power supply of the invention, detailed in FIG. 6, is a multistage peak clamping circuit with both telephone line and PC interface voltage sources. Current draw from the telephone line is limited in the on hook state but not in the off hook state. When necessary, the invention also draws current from the PC interface to supplement the power available from the telephone line.

The power supply is coupled to the telephone line TIP and RING signals 17. A portion of the line interface 17 is expanded here in R36, C37, diode bridge 38, and zener diode 79. C37 blocks the DC portion of the telephone line signal, R36 limits incoming current and forms a portion of the impedance matching network. Diode bridge 38 rectifies the incoming AC signal and zener diode 79 removes transients and limits the voltage seen by the power supply to that specified for ring signals.

Diode 39 blocks the peak clamping circuit of the power supply from feeding back to the telephone network.

Transistor 40, C41, R50, R42, and R43 form a current limiting network that prevents the instantaneous current draw from the telephone network exceeding that required to signal the off hook state. C41 limits the instantaneous current surge experienced when the incoming voltage exceeds that stored in the capacitor bank formed by C44–C49. R42 and R43 limit the maximum current draw to less than that required to signal the telephone switching office that the invention is in the off hook state. When the control logic block 29 places the invention in the off hook state by energizing the hook relay within the line interface 32, the bypass FET 82 is also enabled to allow the invention to draw as much current as necessary (or available if the line characteristics are a limiting factor) from the telephone line.

C44–C48 form a charge storage device used as a voltage source for voltage regulator 65. Capacitors C45–C49 are all of equal value, C44 is approximately 3.7 times the capacitance of any one of C45–C49. Assuming a ring voltage of 86 V peak this arrangement and ratio of capacitors provides voltages of approximately 12 V at the junction of C47 and C48, 24 volts at the junction of C47 and C46, and 48 V at the junction of C44 and C45 when the capacitors have been charged by an 86 V ring signal. C49 stores the peak negative voltage required by the RS-232 interface drivers by clamping the peak negative voltage excursions on TXD.

Assuming the RS-232 connections shown are inactive (unable to source energy to the invention), the circuit works as follows. Given the initial incoming ring cycle, the capacitor bank formed by C44 to C48 charges to the maximum potential of the ring cycle. Voltage reference 50 provides a reference voltage equal to the minimum voltage required by the voltage regulator 65 (plus one diode drop) to provide properly regulated output. From an initial fully charged state, voltage comparator 59 sees that the potential across C48 is sufficient to allow the voltage regulator to properly regulate the output so FET 64 is enabled and the voltage regulator 65 uses C48 as its source. The output of comparator 59 is also coupled to the reference inputs of comparators 60 and 61. When FET 64 is enabled by comparator 59 the same signal forces FETs 63 and 62 to be disabled.

To simplify the analysis assume that the incoming voltage across the telephone network drops to the reference voltage at the end of the two seconds of ring. This causes the energy source used to power the invention to be limited to that stored in the capacitor bank formed by C44–C48.

If the required output voltage from the voltage regulator is +5 Vdc, then it is reasonable to assume that the minimum reference voltage will be approximately 6 Vdc. As energy is drawn from capacitor C48, the potential will drop until it reaches the comparator 59 cutoff point of 6 V. FET 64 is now disabled and comparator 60 now enables FET 63 (thus disabling FET 62). The potential across C47 to ground has now dropped to 12 V (due to the energy draw of the voltage regulator 65). As energy is drawn from the combined C47 and C48 capacitor bank the potential across the two devices now drops until comparator 60 disables FET 63 and comparator 61 enables FET 62. The potential across C45 to ground is, again, approximately 12 V due to the symmetrical nature of the capacitor bank, and capacitors C45 to C48 form an energy source for voltage regulator 65.

Now allow the potential across the telephone line to resume its nominal level. Depending on the characteristics of the subscriber loop, at some point the potential across the capacitor bank will be less than the telephone line voltage. At this time, the capacitor bank C44–C48 will begin to trickle charge from the telephone network.

This rather elaborate staging of the capacitor bank is required to minimize the power dissipation of the voltage regulator. It allows the voltage regulator to see an input potential range of approximately 6 Vdc to 20 Vdc, within the range of many commercially available voltage regulators. If this staging arrangement was not used, much of the potential stored in the capacitor banks would have to be dissipated by a dropping resistor, thus wasting the energy that could be used to power the circuit.

If the interaction of the PC RS-232 port is added, the following occurs. Assuming that the port is active, diodes D51 to D53, connected to DTR, RTS and TXD respectively, act in conjunction with C48 to clamp the voltage across C48 to the maximum level output by the RS-232 port. If this level is greater than that available from the telephone network, the voltage regulator is principally powered by the terminal interface. If an inferior RS-232 interface is being used it is also possible that the circuit may be powered principally from the telephone network. Most practical instances of the invention will be powered by a combination of the two sources depending on the instantaneous voltage levels of the telephone line and RS-232 interface and the current draw of the invention.

Zener diode 81 limits the maximum potential across C48 to the upper limit of the voltage regulator 65.

In a similar manner, D54 and C49 provide the maximum negative voltage required by the RS-232 interface signals. The maximum positive voltage for the RS-232 interface signals is taken from the high voltage side of the voltage regulator 65.

Power for the circuits is obviously a major concern in this invention. Therefore, with reference to FIG. 4, the only device that is powered at all times is the control logic block Power to all other circuits is controlled by the control logic block 29 via FET switches (not shown but simply installed in series between the component and the power supply). This allows the invention to have a power down mode and selective power up modes, thus saving on power requirements If the RS-232 port is inactive and an incoming call is received, the control logic block 29 enables the telephone 24, modem 27, multiplexer 23, and UART 30 at the end of the guard period. When the actual data transmission begins, power is enabled to the UART 31, and RS-232 drivers/receivers 21. If the RS-232 port is currently active (with pass through data only) then the incoming RS-232 drivers/receivers 21, incoming UART 31, outgoing UART 30, the multiplexer 23, and outgoing RS-232 drivers/receivers 22 are enabled. If an incoming call is now received the control logic block 29, enables the telephone 24 and the modem 27 at the end of the guard period.

Depending on the current mode of the invention, the PC can actively and deliberately assist in the powering of the invention. Once the PC has received the signal that the invention is activated (the sequence of five consecutive bytes of FFH), the software on the PC sets the DTR lead to its highest positive voltage state and transmits an alternating sequence of binary 1 and 0 on the TXD lead. The alternating nature of the TXD signal assists in powering the main circuitry of the invention and provides the negative voltage necessary for proper operation of the RS-232 interface(s).

Figure 7:
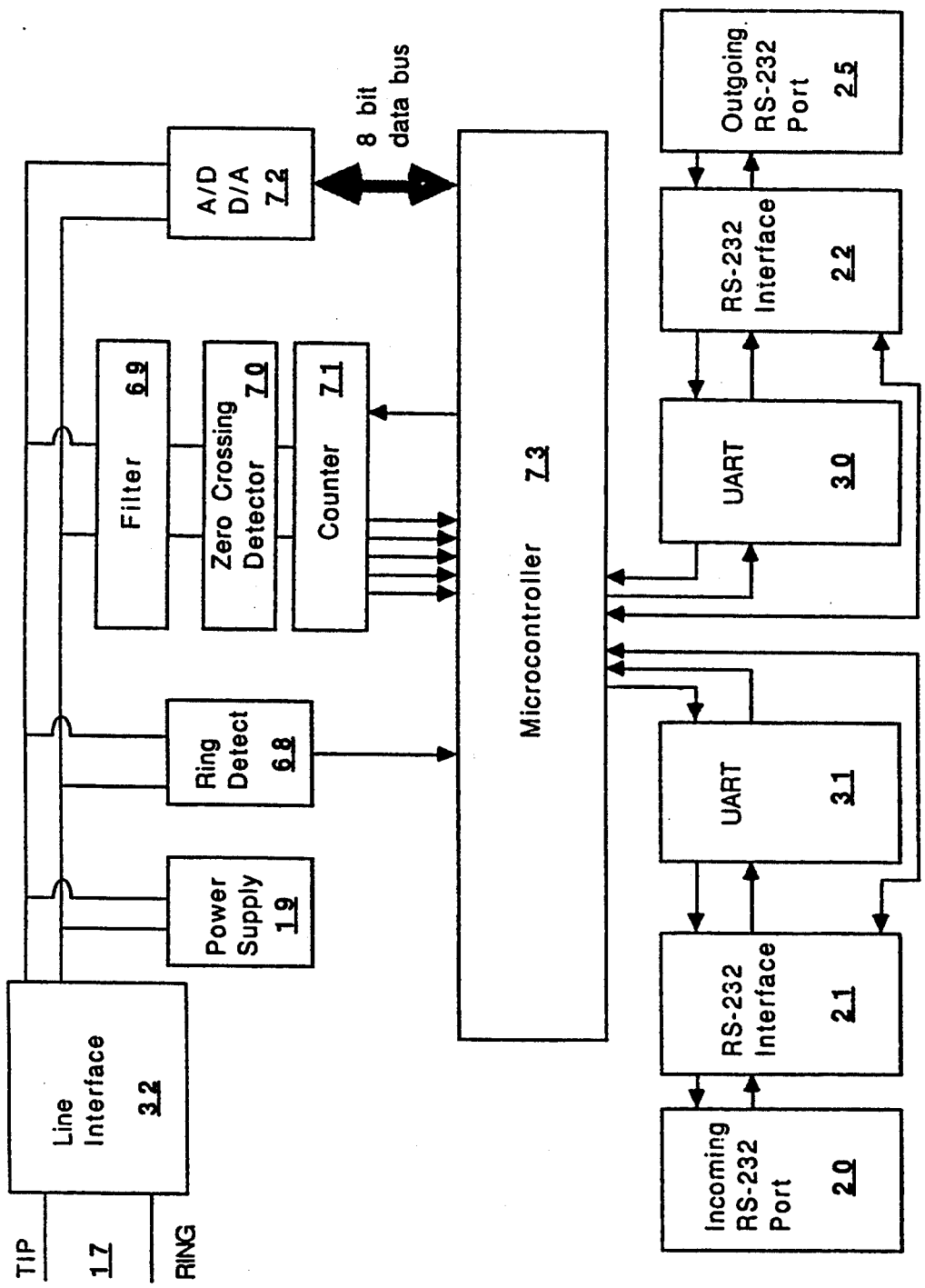
FIG. 7 illustrates an embodiment of the invention implemented using a Digital Signal Processing (DSP) approach.

FIG. 7 illustrates the pass through form of the invention implemented using Digital Signal Processing (DSP) techniques. This is the most flexible approach since it is possible to modify the performance of the circuit by changing the software used by the microcontroller 73.

The core of the DSP implementation is the microcontroller 73. It uses digital approximation techniques to perform all input and output functions. The invention is coupled to the telephone network 17 through the line interface 32. A ring detector 68 is used to signal the microcontroller that ring signal is present on the line to prepare the invention for incoming transmissions. A filter 69, a zero crossing detector 70, and a counter 71 are used together to determine the frequency of incoming signals by counting the number of zero crossings in a given period. This frequency is converted by the microcontroller 73 to a stream of binary ones and zeroes for transmission to the PC. If greater accuracy is required, the A/D converter 72 can be used to sample the level of the incoming signal (rather than simply measuring the frequency of the signal via the number of zero crossings in a given period). Outgoing signals, such as DTMF tones, are synthesized using the D/A converter 72. Methods of digital signal analysis and synthesis are widely available in the literature and are not presented further here.

The microcontroller 73 contains a bootstrap program that is executed on invention powerup or reset. This bootstrap program initializes the hardware and brings it to a known state. Control of the hardware is then passed to a main software program which performs DSP and communications functions. This main software program may also be replaced by a software download from the PC through the incoming RS-232 port 20 into an EEPROM. This downloaded software can be used to change the implementation of the overall functionality necessary for the invention. A software downloadable implementation is highly desirable because it allows the capabilities of the invention to be upgraded via software release rather than hardware circuit redesign and replacement.

The microcontroller 73 implements the functionality of the control logic block 29 of FIG. 4 (or control logic block 26 of FIG. 5 in the terminal implementation). The microcontroller 73 controls power to all devices of the invention and directly controls the RS-232 path. The remaining elements of the RS-232 path—the incoming RS-232 port 20, the incoming RS-232 drivers/receivers 21, the incoming UART 31, the outgoing UART 30, the outgoing RS-232 drivers/receivers 21, and the outgoing RS-232 port 25 all function as explained for FIG. 4.

The DSP approach presented in FIG. 7 increases the overall flexibility and greatly reduces the component count of the invention at the cost of higher power requirements and added design complexity in the form of control software.

A further embodiment of the invention provides for the circuitry described herein to be incorporated into the housing of a standard telephone, with RS-232 outlet 10 in FIG. 2 mounted on the housing of the telephone. This embodiment of the invention would thus provide the full functionality of the invention described herein along with a telephone in one integrated compact unit. Such a telephone in conjunction with the telephone user's computer would be a full replacement for the more expensive dedicated equipment which would otherwise be needed to access the CLASS facilities offered by the telephone network.

In this embodiment, the circuitry could be simply grafted at tip and ring 17 as shown in FIG. 4 into the telephone line within the telephone. A more efficient manner of integrating the invention with a telephone would be to take advantage of the facilities offered by the single chip electronic telephone 24 to introduce the voice signal at this point, thereby in effect replacing the normal contents of the telephone with the invention and simply adding a handset along with appropriate matching networks and control functions to provide the voice functionality. This would be a much more cost effective and efficient manner of implementing the invention in an integrated fashion with a telephone.

While the above description has illustrated the preferred embodiments of the invention, the invention is not limited to the embodiments described. Instead, the objects of the invention may be achieved, albeit with some possible sacrifice to the integrity of the overall system reliability, by eliminating some of the elements of the invention just described.

For example, while there are sound engineering reasons such as noise immunity and data integrity for choosing to incorporate a ring detector in the circuitry of the invention, it is possible to simplify the invention by eliminating the ring detector and then to rely upon the data demodulation means to detect and demodulate any valid data and then simply forward the demodulated data received by the interface through the interface to the computer.

Figure 8:
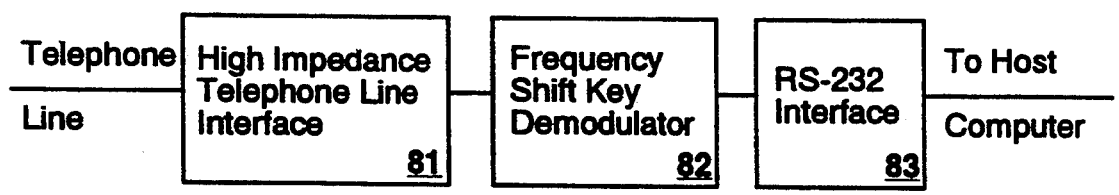
FIG. 8 shows in block diagram form a simplified embodiment of the invention.

FIG. 8 illustrates the simplest possible implementation of the invention for Calling Number Delivery, consisting of a high impedance interface 81 that directly connects to the telephone line, followed by a Frequency Shift Keying demodulator 82. Valid data received by the demodulator and reaching its output is then level shifted to comply with the specifications for an RS-232 interface, for example, and provided to an RS-232 computer interface 83 for output to an external computer.

If it is desired to rely on the audible ringer of the telephone set (which is thus assumed to be colocated with the invention) to provide incoming call alerting to the user or else to rely on host computer software to deal with the issue of call alerting, it would be possible to develop a software filter to remove unwanted noise from the incoming signal such that the ring detection circuitry could be removed. The system would then rely on the noise rejection characteristics provided by the UART internal to the host computer and connected to the RS-232 interface. Depending on the configuration of the UART and its capabilities, and on the software acting as an interface to the UART, the designer may be forced to deal with error messages from the UART such as FRAMING ERROR, PARITY ERROR, and OVERRUN ERROR, etc. These potential errors would depend a great deal on each individual telephone call's timing characteristics.

The above embodiment of the invention shown in FIG. 8 may be simplified even further by implementing it in such a fashion that normal RS-232 interface control signals at the RS-232 interface are inhibited. The effect of this is to produce an invention that is oblivious to the state of the host computer. All data received is simply passed through the invention without even minimal handshaking control being exercised by the host computer receiving the data from the invention. In this case, all RS-232 control signals from the computer are ignored by the invention and the RS-232 signals on the RS-232 interface of the invention which are required by the external host computer are simply held at fixed levels to permit constant data flow to the host computer from the invention. In such a case, the appropriate pins of the RS-232 interface could be simply hard-wired to the appropriate voltage levels without the need for even minimal RS-232 handshaking logic circuitry. Any data received is thus output directly to the computer without further control.

To illustrate, if one assumes that the Calling Number Delivery mechanism of the invention is considered to be Data Communications Equipment (DCE) and the computer to be Data Terminal Equipment (DTE) for the purpose of determining the correct control signal states for an RS-232 interface, then Table 1 illustrates typical control signal states that would need to be observed for such an 'oblivious' interface.

TABLE 1

| Signal | DCE | DTE |
|--------|-----|-----|
| DSR | ON | I |
| DTR | X | ON |
| RTS | ON | X |
| CTS | X | ON |
| TXD | To DTE RXD | I |
| RXD | X | Incoming Caller ID |
| DCD | X | X |
| RI | X | X |

The control logic then devolves under Karnaugh map (or equivalent) analysis to the assignment of the logic levels as listed in the above Table 1. Note that an 'X' in the above table denotes a 'don't care' (ie ignore) condition and that an 'I' means the corresponding state on the DCE.

This implementation thus places all control logic capabilities within the host computer's UART and makes no provision for ring detection, nor in the very simplest embodiment (the 'oblivious' interface) even for handshaking between the RS-232 interface and the host computer. However, if ring detection is incorporated into the invention, then RI on the RS-232 interface of the DCE could be connected to the output of the ring detector.

It is not necessary to incorporate the invention as an interface card or device external to the host computer. The invention could be constructed as an integral part of the computer system, as for example by being incorporated directly on the motherboard of a PC.

Figure 9:
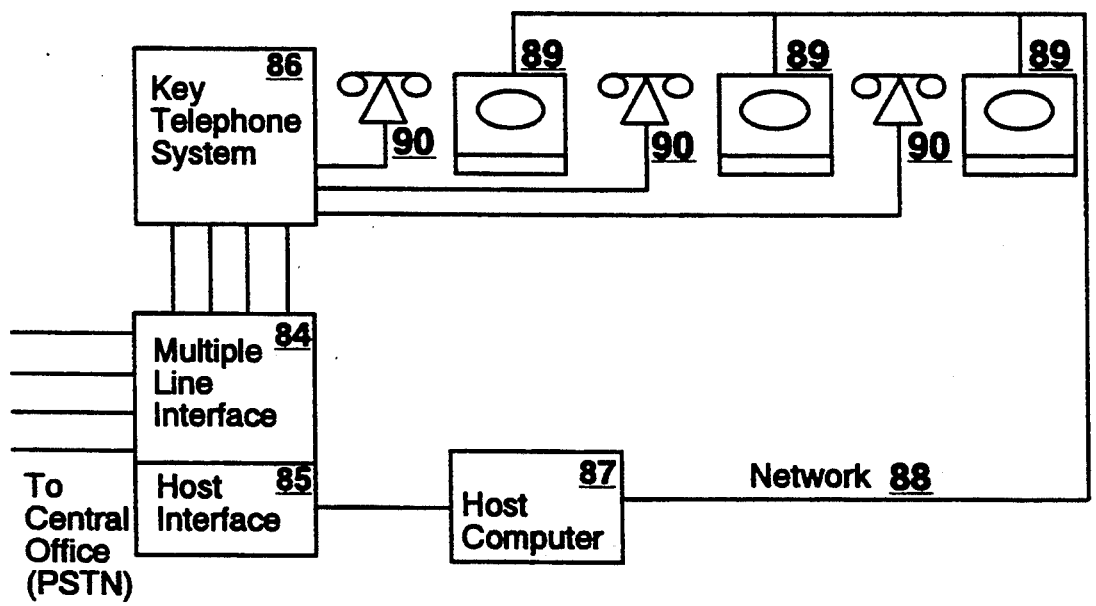
FIG. 9 shows in block diagram form a multiple line interface version of the present invention.

With reference to FIG. 9, it is also possible to envisage a multiple line version 84 of the invention for use for placing between a Key System 86 and the Central Office.

Figure 10:
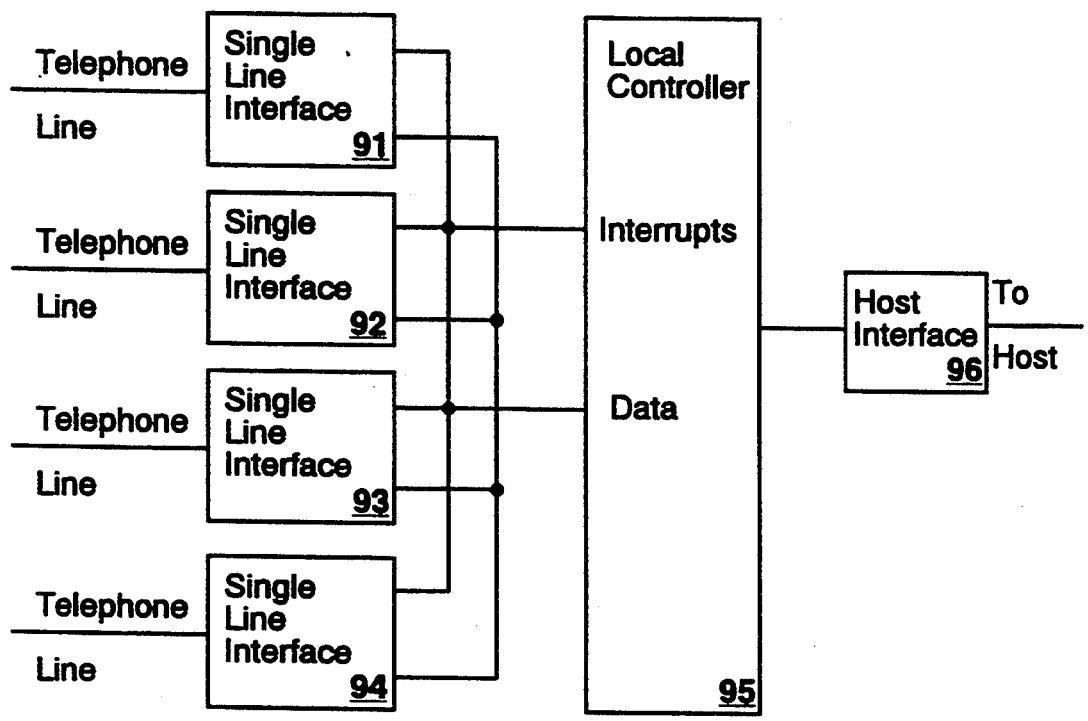
FIG. 10 shows in block diagram form a possible implementation of the multiple line interface shown in FIG. 9.

This embodiment would serve as a retrofit or upgrade to existing key telephone systems to enhance their capabilities to include ICLID delivery. Such a system would require multiple demodulation blocks 91, 92, 93, 94 all connected to a single local controller 92, as shown in FIG. 10, which would then multiplex the incoming data transmissions from each telephone line onto the host interface 93. While there may be any number of demodulation blocks, depending on the demodulation capacity required, four are shown for illustrative purposes only. This host interface could be as simple as an RS-232 interface or it could be a special purpose interface.

The multiple line interface 84 has a host interface 85 to provide a communications path to a host computer 87. The host computer 87 then forwards the ICLID information over the network 88 to computers 89 assumed to be (but not necessarily) colocated with the telephone set 90 that is the destination of the incoming call.

Alternatively, the multiple line interface 84 and host interface 85 could be integral to the key telephone system 86. In this embodiment, a special purpose port could be provided for interfacing to a host computer 87 for the manipulation and/or transfer over the network 88. The key telephone system 86 could also forward the ICLID information to the telephone sets 90 directly. If a distributed ICLID delivery mechanism is desired, then each set 90 could have a computer interface in the style previously disclosed for direct connection to the local computer 89.

The RS-232 implementation of the host interface 96 would be preferred if colocation (within 50 feet of cabling) of the interface and host computer were possible, or if product cost was a concern. If ease of installation is more important then it might be preferable to use a special purpose interface mechanism. Such a special purpose interface would allow communication of the information received during the silent interval between ring signals over greater distances than that supported by the RS-232 specification, at higher speed (if necessary), with greater noise immunity, and preferably over existing building wiring.

The preferred embodiment of the present invention uses industry standard asynchronous communications mechanisms developed for RS-232 communications (i.e. UART's) but uses differential mode transmitters and receivers for greater noise immunity. The communications path is implemented as two simplex circuits, one dedicated to transmission and one dedicated to reception. Each simplex circuit occupies one twisted pair element in standard four wire (two twisted pair) building telephone extension wiring.

Figure 11:
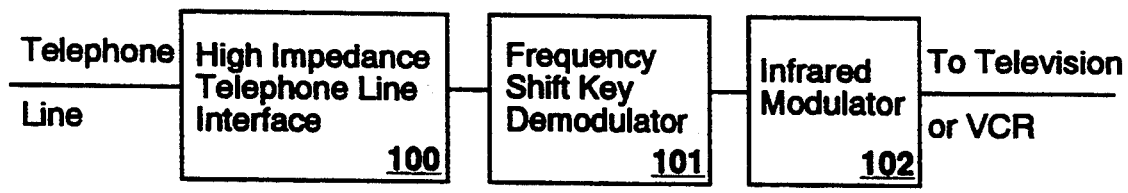
FIG. 11 shows in block diagram form an embodiment of the invention for interface to a television or VCR.

With reference to FIG. 11, a further embodiment of the invention is as an interface to an intelligent household appliance such as a VCR or television. These embodiments allow the ICLID message to be displayed on a television set, perhaps as an alphanumeric display superimposed on the screen or by utilizing the closed caption decoding mechanisms for the deaf. These embodiments could take the form of any of the embodiments previously disclosed with the replacement of the computer interface means with interface means tailored to the desired display means. This embodiment illustrates the high impedance telephone line interface 100 and frequency shift key demodulator 101 (as previously disclosed) interfaced to an infrared modulator 102. The purpose of the infrared modulator 102 is to transmit the ICLID information to a television set or VCR in the well known manner analogous to a remote control device (or an extension thereof). The mechanism for display of the ICLID message may vary from implementation to implementation, but will typically take the form of an alphanumeric display superimposed over the video signal. Character generation for video is considered to be well known in the art.

Figure 12:
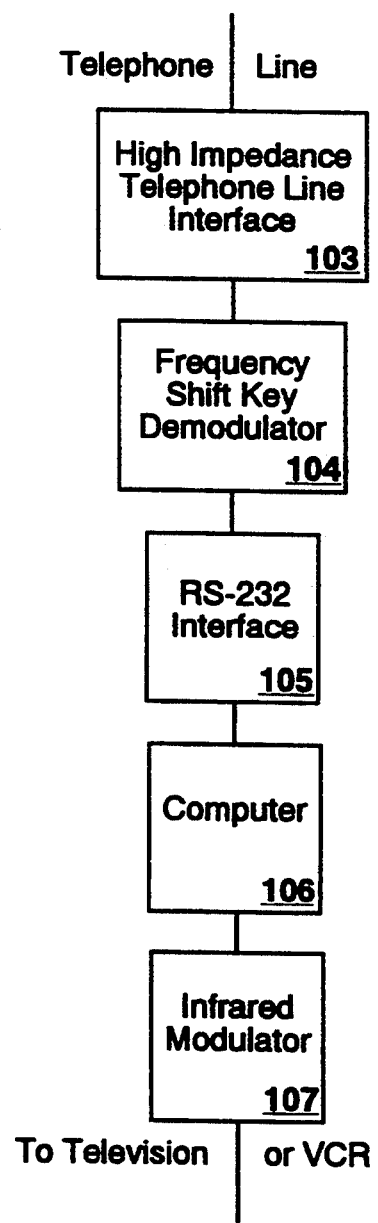
FIG. 12 shows in block diagram form an embodiment of the invention which utilizes a computer to enhance the special service information.
Figure 13:
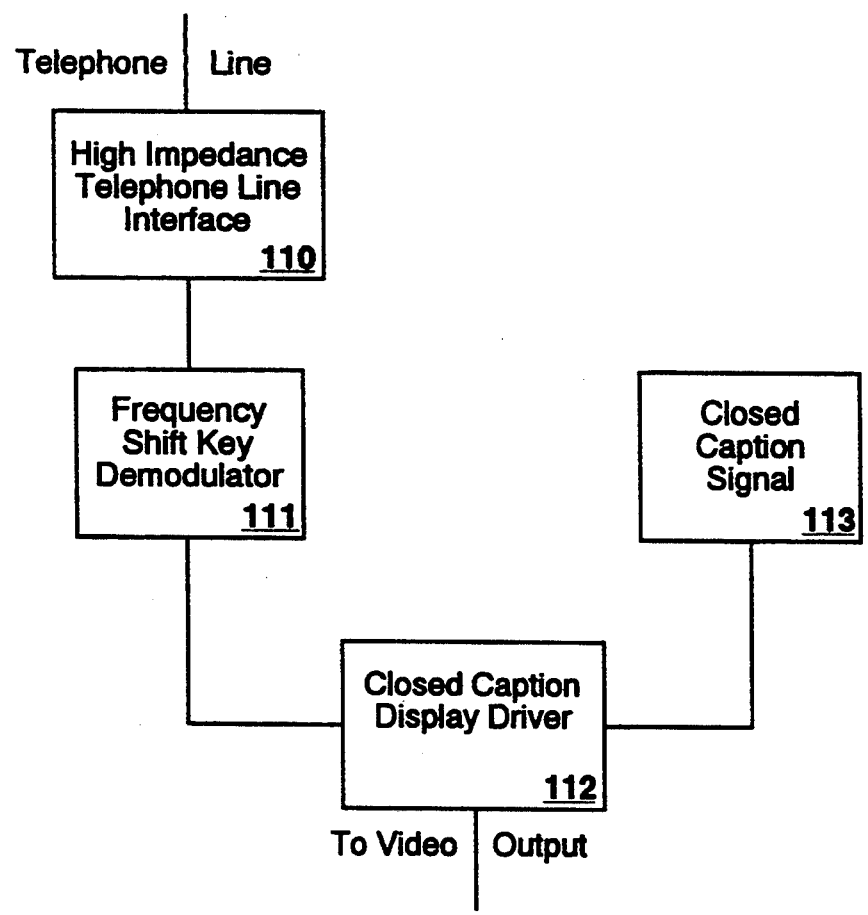
FIG. 13 shows in block diagram form an embodiment of the invention which utilizes the closed caption display mechanism.

With reference to FIG. 12, the infrared modulator 107 could be driven from a combination of the invention and a computer 106. The computer system could perform operations based on the ICLID, such as a database lookup to retrieve a name, and cause the infrared modulator to generate the appropriate commands for the display of the caller's name rather than the caller's number. Additional information, such as a reminder message, relating to the caller, could also be provided.

An alternative mechanism for using the television as a display for ICLID information involves the use of hardware integral to the television set. The mechanism used for the display is that which decodes the Closed Captioning signal for those with hearing disabilities. This signal is included within the vertical retrace interval of standard NTSC encoded broadcasts.

The High Impedance interface 110 and the FSK demodulator 111 extract the signal from the telephone line and forward it to the closed caption display driver 112. The closed caption display driver 112, under normal operation, takes input from the closed caption signal 113. However, the presence of a signal from the FSK demodulator 111 causes the source of the closed caption display signal to switch to the ICLID information and display said information instead.

As shown, the closed caption display driver 112 is capable of performing 1) a serial to parallel conversion of the ICLID signal,
2) the extraction of the pertinent ICLID information,
3) the conversion of the ICLID information format to one suitable for display on the television screen, and
4) the output of the appropriate signal to the video drivers.

These functions are not necessarily integral to the closed caption display signal 112 and may be implemented in a variety of forms, as necessary for successful integration into an existing or proposed system, by one ordinarily skilled in the art.

Figure 14:
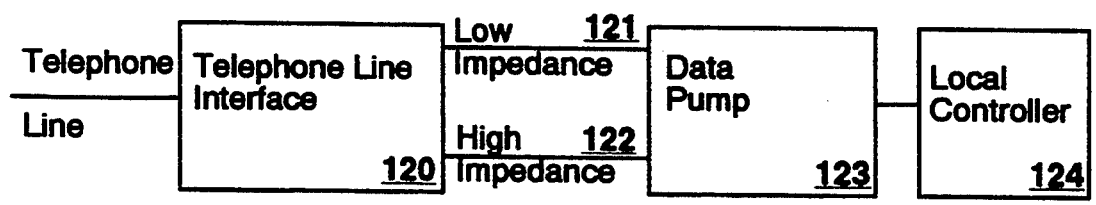
FIG. 14 shows in block diagram form an embodiment of the invention for modems or facsimiles.

With reference to FIG. 14, a further embodiment of the invention would make the disclosed interface means integral to a computer modem or fax machine. This would allow the local controller for the modem or fax machine to make decisions as to whether to answer the call based on the messaging received in the silent interval between ring signals.

In this embodiment, the functionality of the modem or fax machine are represented by the Data Pump 123. The integration of the ability to modulate and demodulate many different communications standards, for both data communications and facsimile transmission, is well known. The Line Interface 120 provides a low impedance Path 122 for communications in the off-hook state, and a high impedance path 122 for reception of the special service information in the on hook state. The Data Pump 123 demodulates the special service information and forwards said information to the local controller 124. The local controller may then respond as directed, by stored program or other means, to the special service information.

Another embodiment would call for the extension of the protocol for CLASS to include a message indicating the type, or purpose, of the call. As an example, identification codes for the message types could be set as follows:
10=voice,
11=fax,
12=modem.

These identification codes would allow a single number to be used for multiple functions while eliminating any difficulties associated with identifying the type of call.

Figure 15:
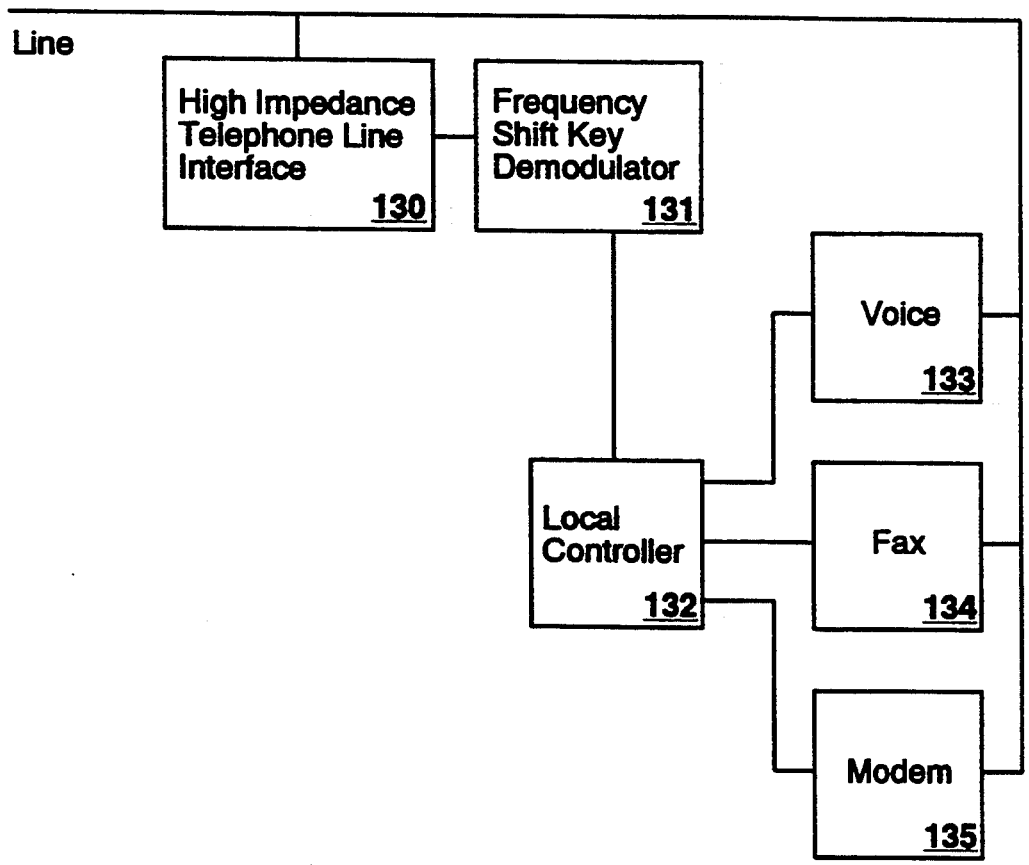
FIG. 15 shows in block diagram form an embodiment of the invention used as a control mechanism for routing incoming calls, based on special service information, to special purpose customer premise equipment.
Figure 16:
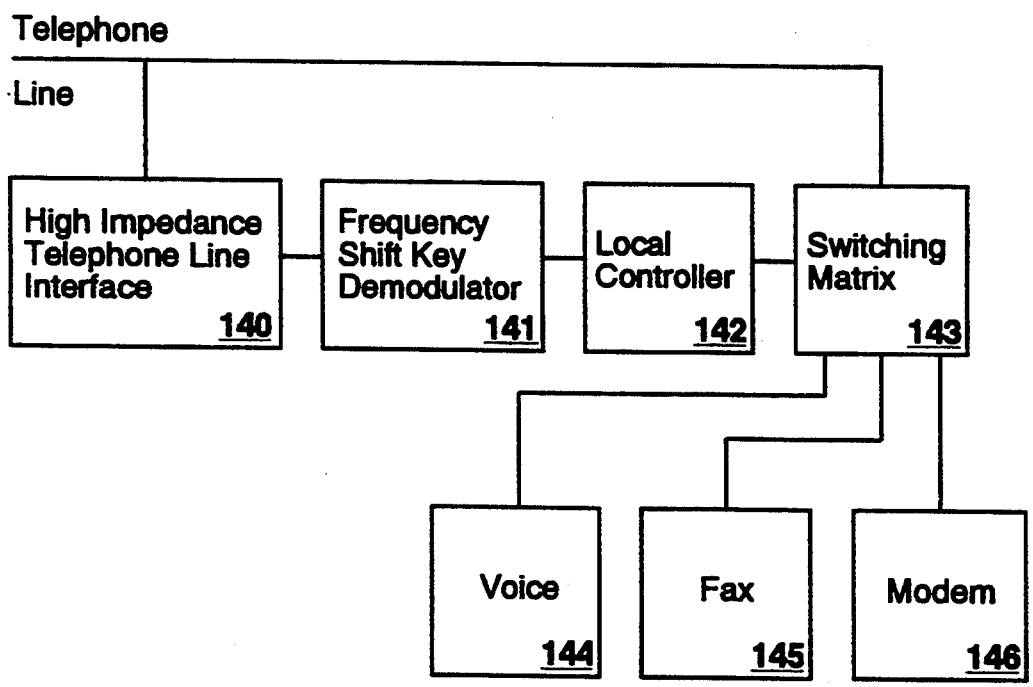
FIG. 16 shows in block diagram form an embodiment of the invention used as a control mechanism for routing incoming calls, based on special service information, to oblivious customer premise equipment.

FIG. 15 presents and embodiment of the invention for customer premise equipment under the direction of a local controller. FIG. 16 presents an embodiment that allows traditional customer premise equipment to be utilized in an analogous manner. The high impedance interface 130 and the FSK demodulator 131 extract the special services information from the incoming signal and forward it to the local controller 132. The local controller interprets the special service information and directs the appropriate destination device, be it a voice system 133, facsimile 134, modem 135 or other device to respond to the incoming call.

An alternative embodiment, given in FIG. 16, uses a high impedance interface 140 and an FSK demodulator 141 to extract the special service information from the incoming signal and forward said information to the local controller 142. The local controller then operates a switching matrix to direct the incoming call to the appropriate customer premise equipment e.g. voice 144, facsimile 145, modem 146, or other equipment as desired.

It is reasonable to expect that one ordinarily skilled in the art could integrate the present invention with the customer premise equipment to create "intelligent" devices that would respond only to the correct type of call.

Figure 17:
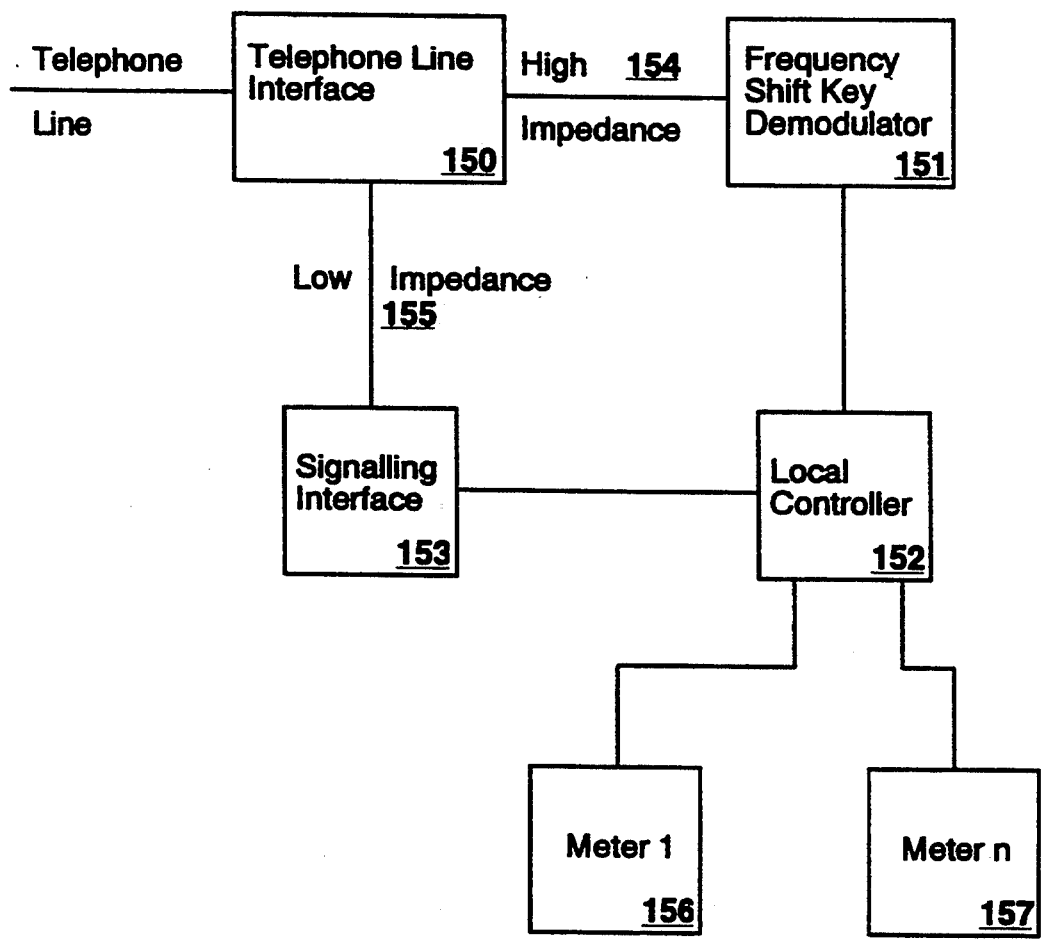
FIG. 17 shows in block diagram form an embodiment of the invention used as an interface to allow usage meters to be read remotely.

With reference to FIG. 17, a further embodiment of the invention is as an intelligent interface to customer premise metering equipment such as that used for measuring consumption of natural gas, electricity, or water. In this embodiment, the purpose of this invention is to allow utility companies to remotely query the meter reading via the telephone network. This eliminates the need to have an individual physically visit each site to determine the consumption for a given time period.

The ICLID information can be used to verify which utility is calling to determine which meter should be read and what information should be forwarded to the utility. For example, if the gas company calls from 555-1000 then the invention recognizes the ICLID information as indicating a call from the gas company and would then read the gas meter and forward the reading to the caller. If the water company calls from 555-2000 then the invention recognizes the ICLID information as indicating a call from the water company and would then read the water meter and forward the reading to the caller. Therefore, the local controller would contain, as presets, the ICLID information used to identify the calling party. Alternatively, it is obvious that the protocol extensions discussed with reference to FIG. 15 and FIG. 16 could be used to identify the purpose of the call as "read the water meter and return the reading", "read the gas meter and return the reading", etc . . . .

This embodiment uses a telephone line interface 150 with a high impedance signalling path 154 and a low impedance signalling path 155. The high impedance signalling path allows the special signalling information transmitted in the silent interval between rings to be input to the frequency shift key demodulator 151. The FSK demodulator 151 converts the input signal into a digital format that can be read by the local controller 152. The local controller 152 interprets this information and determines if the invention is the intended destination for the call in the manner previously described. If the invention is the destination of the call, the local controller reads the appropriate meter 156, 157 to determine the current value. Only two meters are shown for illustrative purposes, any number of one or more meters may be queried. The local controller 152 then causes the signalling interface 153 to be placed in the off hook state to allow the meter reading to be transmitted to the calling party. The mechanism used to transmit the meter reading could take many forms. Typical mechanisms would be the use of DTMF signalling or any one of the numerous modem standards.

It is reasonable to expect that any or all of the above embodiments could be incorporated into a variety of forms including, but not limited to:
integral to a telephone set,
integral to a Personal Computer,
integral to a key telephone system,
integral to a modem,
integral to a fax machine,
integral to a VCR, and
integral to a television,
and both external interfaces to and multiple line versions of all of the above, by one ordinarily skilled in the art.

While this invention has been described in conjunction with preferred embodiments thereof, it is obvious that other modifications and changes therein in addition to the examples discussed above may be made by those skilled in the art without departing from the spirit and scope of this invention.

What we claim as our invention is:

1. A telephone interface for connecting a computer to a telephone line for use in telephone systems employing information signalling during the silent interval between rings comprising:
line interface means for interfacing the telephone interface with the telephone line,
first computer interface means for interfacing the telephone interface with a computer, and
data demodulation means connected with the line interface means and with the first computer interface means for receiving data transmitted over the telephone line during a silent interval after a ringing signal,
whereby in operation data present on the telephone line during the silent interval is retransmitted through the first computer interface means.

2. The telephone interface as claimed in claim 1 wherein the first computer interface means includes at least means for constantly asserting a Request to Send signal at the first computer interface means.

3. The telephone interface as claimed in claim 1 further including control means for controlling flow of the data between the data demodulation means and the first computer interface means.

4. The telephone interface as claimed in claim 3 further including:
second computer interface means in connection with the first computer interface means whereby data may be transferred through the telephone interface between said first and said second computer interface means, and
the control means further includes means for temporarily interrupting flow of the data between the first computer interface means and the second computer interface means whereby in operation data present on the telephone line during the silent interval is retransmitted through the first computer interface means.

5. The apparatus as claimed in claim 4 wherein the control means provides a signal at the first computer interface means whether the data is coming from the data demodulation means or the second computer interface means by a byte stuffing process.

6. The telephone interface as claimed in claim 3 wherein
the data demodulation means includes means for sensing analog data signals transmitted over the telephone line during a silent interval after a ringing signal and converting them into digital data signals in microprocessor readable form, and
the control means includes:
stored program means for storing a logic control program, and
microprocessor means for controlling the flow of data between the data demodulation means and the first computer interface means in accordance with the logic control program.

7. The telephone interface as claimed in claim 6 wherein the logic control program may be changed by signals sent through the first computer interface.

8. The telephone interface as claimed in claims 1, 3, 4 or 6 wherein the first computer interface means includes an interface board means pluggable into an interface slot in a computer for interfacing the telephone interface with the computer.

9. The telephone interface as claimed in claim 1, 3, 4 or 6 wherein the first computer interface means is an RS-232 computer interface.

10. The telephone interface as claimed in claims 1, 3, 4 or 6 wherein the telephone interface is incorporated onto a computer motherboard.

11. The telephone interface as claimed in claims 1, 3, 4 or 6 including
signal generation means in connection with the line interface means, and
the control means further controls the generation of signals by the signal generation means in response to signals received through the first computer interface means for transmission to the telephone line.

12. The telephone interface as claimed in claim 11 wherein the signal generation means includes dial pulse signal generation 13. The telephone interface as claimed in claim 11 wherein the signal generation means includes dual tone multiple frequency signal generation means.

14. The telephone interface as claimed in claim 11 wherein the signal generation means includes data modulation means for transmitting data to the telephone line, and the control means further controls the passage of data between the first computer interface means and the data modulation means for transmission to the telephone line.

15. The telephone interface as claimed in claims 1, 3, 4 or 6 including a power supply comprising:
line matching means for connecting the power supply to a telephone line,
line voltage rectifier means connected to the line matching means for rectifying voltage from the line matching means,
reference voltage means connected to the line voltage rectifier means to provide a predetermined reference voltage,
interface voltage rectification means connected to the first computer interface means for rectifying voltage from the first computer interface means,
charge storage network means connected to the line voltage rectifier means and to the interface voltage rectification means comprising a plurality of capacitor means in series,
logic voltage selection means for selecting a source of lower output voltage from the charge storage network means which is greater than the reference voltage,
wherein as output voltage available from the charge storage network means varies, the logic voltage selection means switches the source of output voltage to a point of lower voltage potential in the charge storage network means greater than the reference voltage.

16. A telephone interface as claimed in claim 15 wherein the logic voltage selection means comprises:
at least one voltage comparator means for comparing a voltage across at least one of the plurality of capacitor means of the charge storage network with the reference voltage, and
selection means controlled by the voltage comparator means for selecting a source of lower output voltage from the charge storage network greater than the reference voltage.

17. A telephone interface as claimed in claim 15 including
current limiting means connected to the voltage rectifier means for limiting current flow from the telephone line in excess of a predetermined amount while the telephone line is in the on-hook state.

18. A telephone interface as claimed in claim 16 wherein the logic voltage selection means is comprised of three voltage comparator means and three selection means.

19. A telephone interface as claimed in claim 18 wherein the charge storage network means comprises capacitor means selected to provide output voltages which are approximately 12/86ths, 24/86ths, and 48/86ths of the voltage input to the charge storage network means.

20. The telephone interface as claimed in claim 4 wherein
the data demodulation means includes means for sensing analog data signals transmitted over the telephone line during a silent interval after a ringing signal and converting them into digital data signals in microprocessor readable form, and
the control means includes:
stored program means for storing a logic control program, and
microprocessor means for controlling the flow of data between the data demodultion means and the first computer interface in accordance with the logic control program.

21. The telephone interface as claimed in claim 6 wherein the first computer interface means includes an interface board means pluggable into an interface slot in a computer for interfacing the telephone interface with the computer.

22. The telephone interface as claimed in claim 20 wherein the first computer interface means includes an interface board means pluggable into an interface slot in a computer for interfacing the telephone interface with the computer.

23. The telephone interface as claimed in claim 6 wherein the first computer interface means is an RS-232 computer interface.

24. The telephone interface as claimed in claim 20 wherein the first computer interface means is an RS-232 computer interface.

25. The telephone interface as claimed in claim 6 wherein the telephone interface is incorporated onto a computer motherboard.

26. The telephone interface as claimed in claim 6 including
signal generation means in connection with the line interface means, and
the control means further controls the generation of signals by the signal generation means in response to signals received through the first computer interface means for transmission to the telephone line.

27. The telephone interface as claimed in claim 26 wherein the signal generation means includes dial pulse signal generation means.

28. The telephone interface as claimed in claim 26 wherein the signal generation means includes dual tone multiple frequency signal generation means.

29. The telephone interface as claimed in claim 26 wherein the signal generation means includes data modulation means for transmitting data to the telephone line, and the control means further controls the passage of data between the first computer interface means and the data modulation means for transmission to the telephone line.

30. The telephone interface as claimed in claim 6 including a power supply comprising:
line matching means for connecting the power supply to a telephone line,
line voltage rectifier means connected to the line matching means for rectifying voltage from the line matching means,
reference voltage means connected to the line voltage rectifier means to provide a predetermined reference voltage,
interface voltage rectification means connected to the first computer interface means for rectifying voltage from the first computer interface means,
charge storage network means connected to the line voltage rectifier means and to the interface voltage rectification means comprising a plurality of capacitor means in series,
logic voltage selection means for selecting a source of power output voltage from the charge storage network means which is greater than the reference voltage,
wherein as output voltage available from the charge storage network means varies, the logic voltage selection means switches the source of output voltage to a point of lower voltage potential in the charge storage network means greater than the reference voltage.

31. The telephone interface as claimed in claim 20 including a power supply comprising:
line matching means for connecting the power supply to a telephone line,
line voltage rectifier means connected to the line matching means for rectifying voltage from the line matching means,
reference voltage means connected to the line voltage rectifier means to provide a predetermined reference voltage,
interface voltage rectification means connected to the first computer interface means for rectifying voltage from the first computer interface means,
charge storage network means connected to the line voltage rectifier means and to the interface voltage rectification means comprising a plurality of capacitor means in series,
logic voltage selection means for selecting a source of lower output voltage from the charge storage network means which is greater than the reference voltage,
wherein as output voltage available from the charge storage network means varies, the logic voltage selection means switches the source of output voltage to a point of lower voltage potential in the charge storage network means greater than the reference voltage.

32. A telephone interface as claimed in claim 30 wherein the logic voltage selection means comprises: p1 at least one voltage comparator means for comparing a voltage across at least one of the plurality of capacitor means of the charge storage network with the reference voltage, and
selection means controlled by the voltage comparator means for selecting a source of lower output voltage from the charge storage network greater than the reference voltage.

33. A telephone interface as claimed in claim 31 wherein the logic voltage selection means comprises:
at least one voltage comparator means for comparing a voltage across at least one of the plurality of capacitor means of the charge storage network with the reference voltage, and
selection means controlled by the voltage comparator means for selecting a source of lower output voltage from the charge storage network greater than the reference voltage.

34. A telephone interface as claimed in claim 30 including
current limiting means connected to the voltage rectifier means for limiting current flow from the telephone line in excess of a predetermined amount while the telephone line is in the on-hook state.

35. A telephone interface as claimed in claim 31 including current limiting means connected to the voltage rectifier means for limiting current flow from the telephone line in excess of a predetermined amount while the telephone line is in the on-hook state.

36. A telephone interface as claimed in claim 32 wherein the logic voltage selection means is comprised of three voltage comparator means and three selection means.

37. A telephone interface as claimed in claim 33 wherein the logic voltage selection means is comprised of three voltage comparator means and three selection means.

38. A telephone interface as claimed in claim 36 wherein the charge storage network means comprises capacitor means selected to provide output voltages which are approximately 12/86ths, 24/86ths, and 48/86ths of the voltage input to the charge storage network means.

39. A telephone interface as claimed in claim 37 wherein the charge storage network means comprises capacitor means selected to provide output voltages which are approximately 12/86ths, 24/86ths, and 48/86ths of the voltage input to the charge storage network means.

40. A telephone interface for connecting at least one telephone line to an external communications device for use in telephone systems employing information signalling during the silent interval between rings comprising:

at least one line interface means for interfacing the telephone interface with the telephone line, external interface means for interfacing the telephone interface with an external communications device, and data demodulation means connected with the at least one line interface means and with the external interface means for receiving data transmitted over the telephone line during a silent interval after a ringing signal, whereby in operation data present on the telephone line during the silent interval is retransmitted through the external interface means.

41. The telephone interface of claim 40 wherein the external interface means includes means for transmitting data between the telephone interface and an apparatus for processing television signals.

42. The telephone interface of claim 41 wherein the data is transmitted by means of infrared light.

43. The telephone interface of claim 40 wherein the external interface means includes means for transmitting data between the telephone interface and a facsimile machine.

44. The telephone interface of claim 40 wherein the external interface means includes means for transmitting data between the telephone interface and a modem.

45. The telephone interface of claim 40 including means responsive to a portion of the data present on the telephone line during the silent interval between ringing and indicative of the type of information transmission to be sent associated with an incoming telephone call to control at least one external communication device connected to the external interface means.

* * * * *